United States Patent [19]
Yu-Mei

[11] Patent Number: 5,667,109
[45] Date of Patent: Sep. 16, 1997

[54] MILK POWDER CONTAINER

[76] Inventor: Tien Lin Yu-Mei, P.O. Box 82-144, Taipei, Taiwan

[21] Appl. No.: 381,225

[22] Filed: Jan. 31, 1995

[51] Int. Cl.$^6$ ............................................. G01F 11/26
[52] U.S. Cl. .......................... 222/456; 222/557; 222/560
[58] Field of Search ............................. 222/434, 440, 222/444, 456, 519, 520, 526, 537, 548, 557, 560

[56] References Cited

U.S. PATENT DOCUMENTS

| | | | |
|---|---|---|---|
| 3,005,578 | 1/1961 | Mainieri | 222/557 |
| 3,414,172 | 12/1968 | Souza | 222/456 |
| 4,500,016 | 2/1985 | Funfstuck | 222/520 |
| 4,961,521 | 10/1990 | Eckman | 222/456 |

FOREIGN PATENT DOCUMENTS 2802210  7/1979  Germany ..................... 222/456

*Primary Examiner*—Philippe Derakshani
*Attorney, Agent, or Firm*—Alfred Lei

[57] ABSTRACT

A milk powder container including a cylindrical bottle formed with threads at a lower end and a threaded neck at an upper portion, the cylindrical bottle having a top end formed with a semi-circular opening and a first semi-circular groove under the top end, a bottom cover threadedly engaged with a bottom of the cylindrical bottle, a control knob having a second semi-circular opening, a protuberance at a bottom adapted to the first semi-circular groove, and a lug at an outer side, an adjusting annular member formed with threads at an inner surface adapted to engage the threaded neck of the cylindrical bottle, a first groove at an upper portion of the inner surface, and a second groove at an outer surface, a retainer ring engaged with the second groove of the adjusting annular member, a cup formed at a lower edge with a flange adapted to fit into the first groove of the adjusting annular member, a longitudinal ear at an outer side with a corresponding slot at an opposite side adapted to receive the lug of said adjusting annular member, and a raised protrusion at an upper portion, and a cap engageable with a top end of the cup.

2 Claims, 4 Drawing Sheets

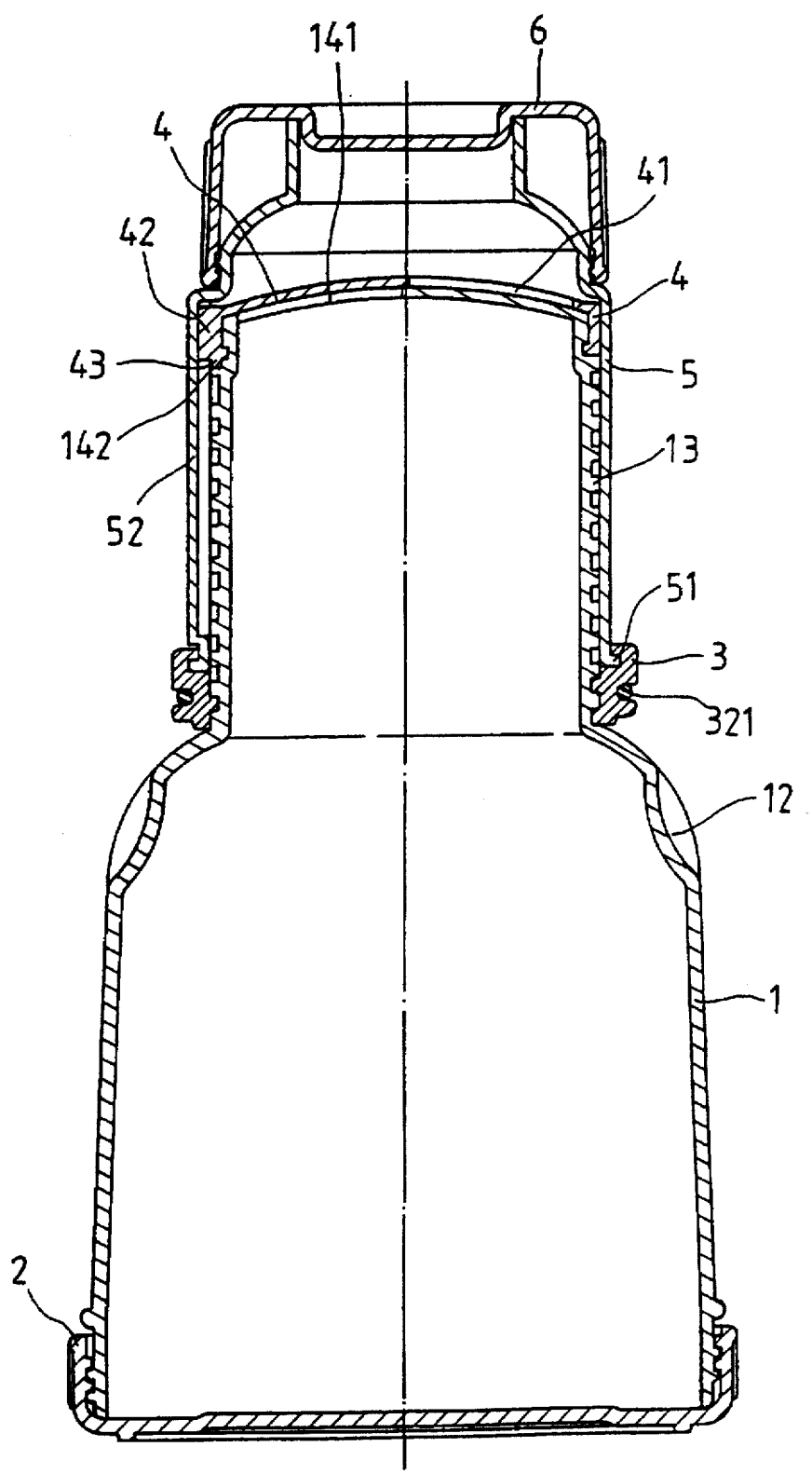
F I G. 3

MILK POWDER CONTAINER

BACKGROUND OF THE INVENTION

It has been found that housewives measure milk power with measuring dippers when preparing milk for babies and so they have to stand the trouble caused by occasionally wrong memorized quantity of the powder and the lost powder dropped out of the milk bottles when pouring the milk from measuring dippers. Furthermore, a mother has to bring with her a proper quantity of milk power when going out with her bay for longer time thereby causing much inconvenience.

Therefore, it is an object of the present invention to provide a milk powder container which can obviate and mitigate the above-mentioned drawbacks.

SUMMARY OF THE INVENTION

This invention relates to an improved milk powder container.

It is the primary object of the present invention to provide a milk powder container which is controllable in dispensing quantity.

It is another object of the present invention to provide a milk powder container which is convenient to carry.

It is still another object of the present invention to provide a milk powder container which is simple in construction.

It is still another object of the present invention to provide a milk powder container which is easy to operate.

It is a further object of the present invention to provide a milk powder container which is practical in use.

Other objects and merits and a fuller understanding of the present invention will be obtained by those having ordinary skill in the art when the following detailed description of the preferred embodiment is read in conjunction with the accompanying drawings wherein like numerals refer to like or similar parts.

BRIEF DESCRIPTION OF THE DRAWINGS

FIG. 3 is a sectional view of the present invention;

DETAILED DESCRIPTION OF THE PREFERRED EMBODIMENT

Figure 1:
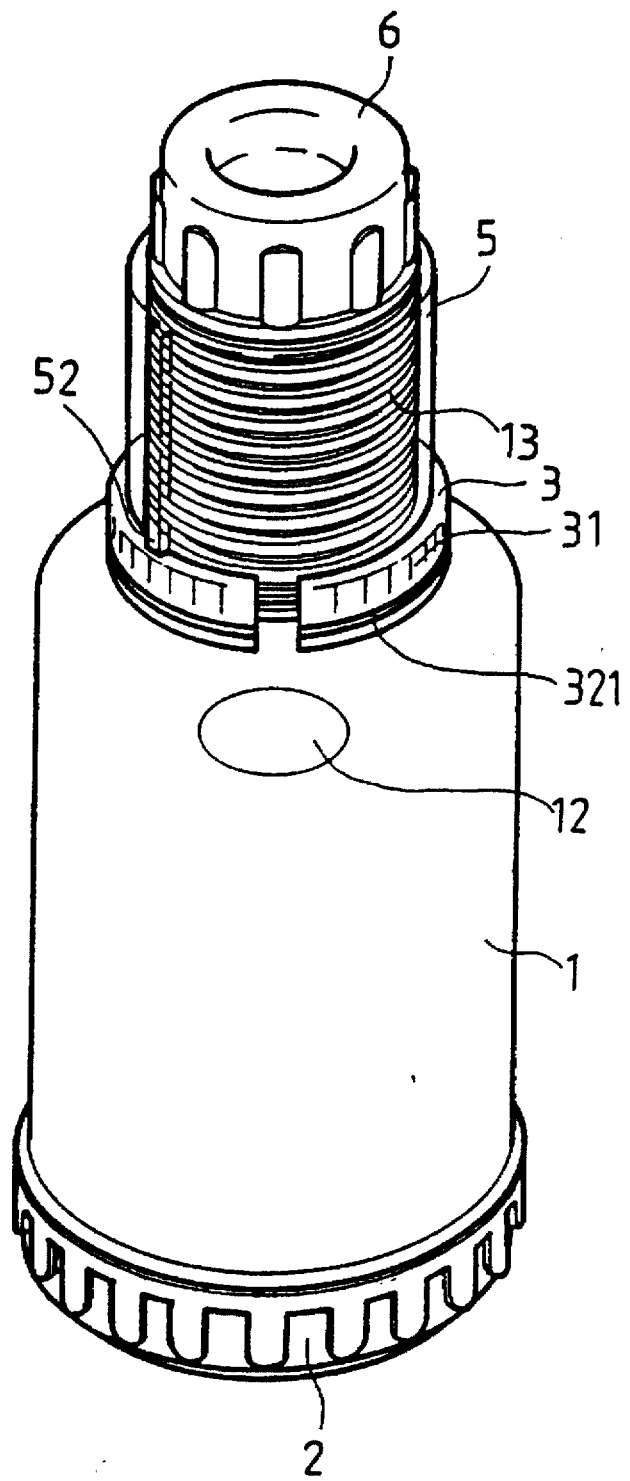
FIG. 1 is a perspective view of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
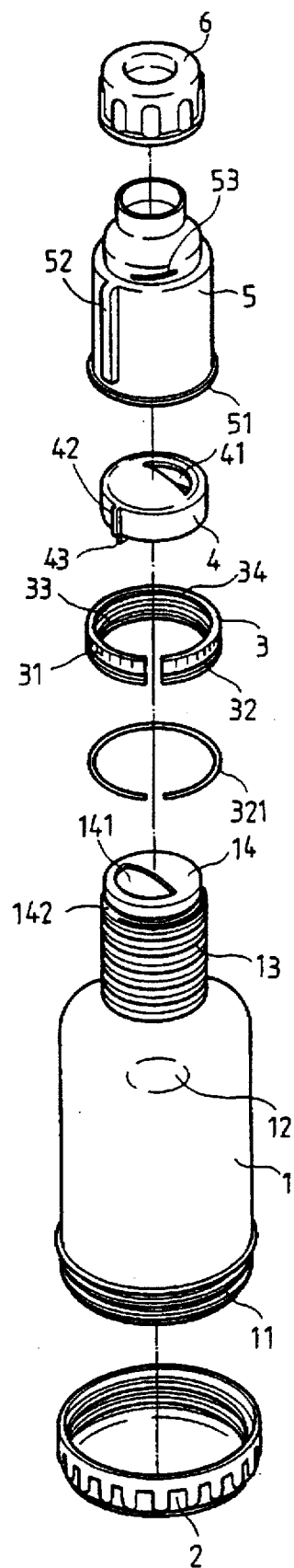
FIG. 2 is an exploded view of the present invention.

With reference to the drawings and in particular to FIGS. 1, 2 and 3 thereof, the milk powder container according to the present invention mainly comprises a cylindrical bottle 1, a bottom cover 2, a retainer ring 321, an adjusting annular member 3, a control knob 4, a cup 5 and a cap 6.

The cylindrical bottle i is formed with threads 11 at the lower end and threaded neck 13 at the upper end. Further, the cylindrical bottle 1 has two opposite recesses 12 for making it easier to hold the cylindrical bottle 1. The bottom cover 2 is engaged with the threads 11 of the cylindrical bottle 1. The top end 14 of the cylindrical bottle 1 is formed with a semi-circular opening 141. Under the top end 14 of the cylindrical bottle 1 there is a semi-circular groove 142. The control knob 4, which has a semi-circular opening 41, a protuberance 43 at the bottom, and a lug 42 at the outer side, is mounted on the top end 14 of the cylindrical bottle 1 with its protuberance 43 engaged with the semi-circular groove 142, so that the control knob 4 can be rotated through an angle of 180 degrees with respect to the top end 14 of the cylindrical bottle 1 thereby aligning the semi-circular opening 41 of the control knob 4 with the semi-circular opening 141 of the cylindrical bottle 1.

The adjusting annular member 3 formed with threads 33 at its inner surface, a first groove 34 at the upper portion of its inner surface and a groove 32 at its outer surface is threadedly engaged with the neck 13 of the cylindrical bottle 1. Further, the outer surface of the adjusting annular member 3 is provided with knurling 31 for increasing its friction coefficient. The retainer ring 31 is engaged with the groove 32 of the adjusting annular member 3 for preventing the adjusting annular member 3 from detaching from the cylindrical bottle 1.

Figure 4:
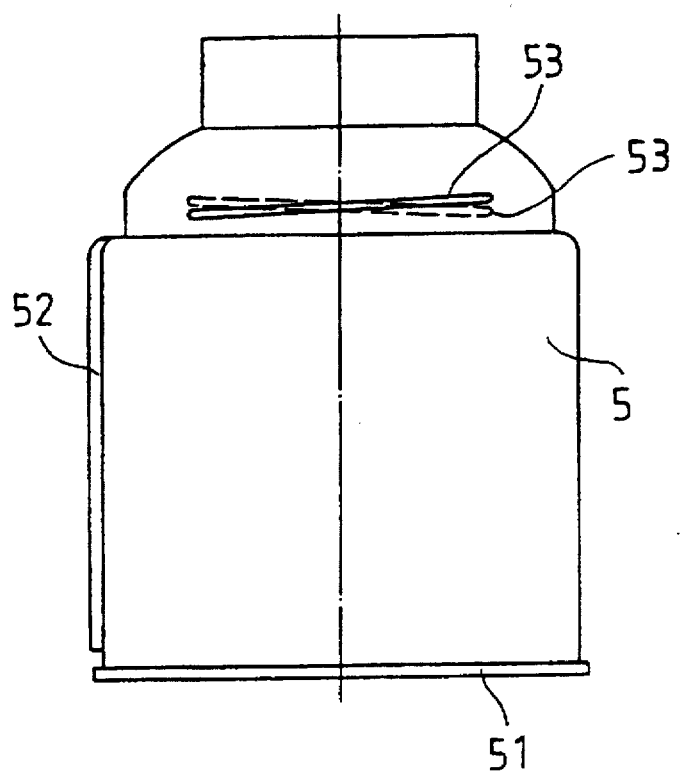
FIG. 4 is a side view of the cup.

The cup 5 (see FIG. 4) is formed with a flange 51 at the lower edge, a longitudinal ear 52 at the outer side with a corresponding slot (not shown) at the inner side, and a raised portion 53 at the upper portion. The flange 51 of the cup 5 is adapted to fit into the groove 34 of the adjusting annular member 3, while the slot is adapted to receive the lug 42 of the adjusting annular member 3.

Figure 5:
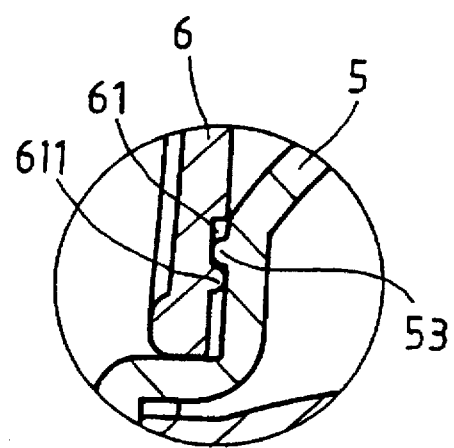
FIG. 5 is sectional view showing the engagement between the cup and the cap.

The cap 6 (see FIG. 5) is formed with a circular groove 61 at its lower inner surface and a raised projection 611 so that when the cap 6 is turned relative to the cup 5, the raised projection 611 will be engaged with the raised portion 53 hence firmly engaging the cap 6 with the cup 5.

When in use, first rotate the adjusting annular member 3 thereby turning the adjusting annular member 3 together with the cup 5 upwards and therefore forming a chamber for receiving milk powder. Then, rotate the cup 5 which will in turn rotate the control knob 4 thereby aligning the semi-circular opening 141 of the cylindrical bottle 1 with the semi-circular opening 41 of the control knob 4. Thereafter, invert the container so that a predetermined amount of the milk power drops into a cup 5. Then, rotate the control knob 4 to close the opening 141. Then, remove the cap 6 to let the milk power drop into a milk bottle (not shown). Accordingly, a predetermined amount of milk powder will be discharged from the cylindrical bottle 1.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A milk powder container comprising:
    a cylindrical bottle formed with threads at a lower end and a threaded neck at an upper portion, said cylindrical bottle having a top end formed with a semi-circular opening and a first semi-circular groove under the top end;

a bottom cover threadedly engaged with a bottom of said cylindrical bottle;

a control knob having a second semi-circular opening, a protuberance at a bottom adapted to the first semi-circular groove, and a lug at an outer side;

an adjusting annular member formed with threads at an inner surface adapted to engage the threaded neck of said cylindrical bottle, a first groove at an upper portion of the inner surface, and a second groove at an outer surface;

a retainer ring engaged with the second groove of said adjusting annular member;

a cup formed at a lower edge with a flange adapted to fit into the first groove of said adjusting annular member, a longitudinal ear at an outer side with a corresponding slot at an opposite side adapted to receive the lug of said adjusting annular member, and a raised protrusion at an upper portion; and a cap engageable with a top end of said cup.

2. The milk powder container as claimed in claim 1, wherein said cap is formed with a circular groove at a lower inner surface and a raised projection engageable with the raised protrusion of said cup.

* * * * *